March 25, 1969  D. A. ELY  3,434,396
PISTON DIAPHRAGM COMBINATION
Filed Feb. 20, 1967
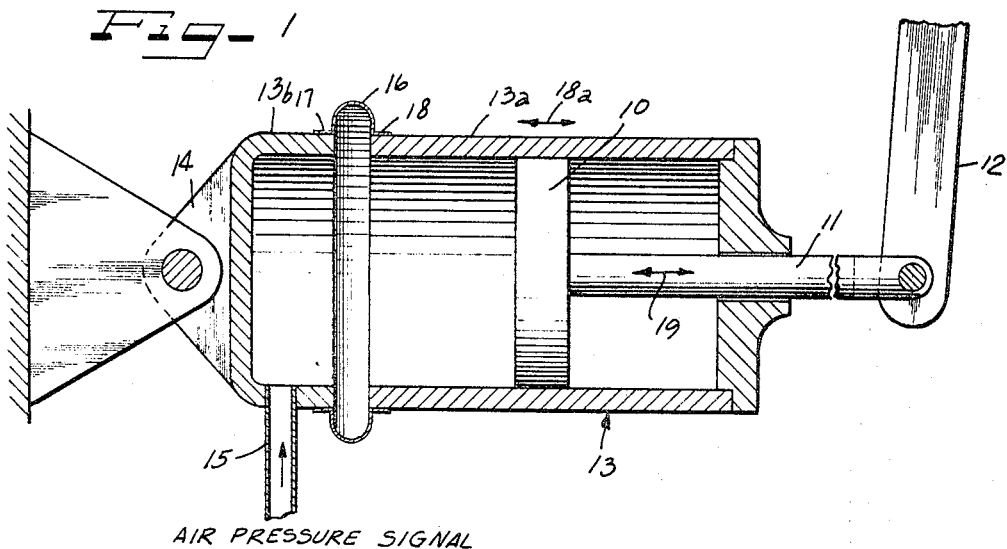
AIR PRESSURE SIGNAL
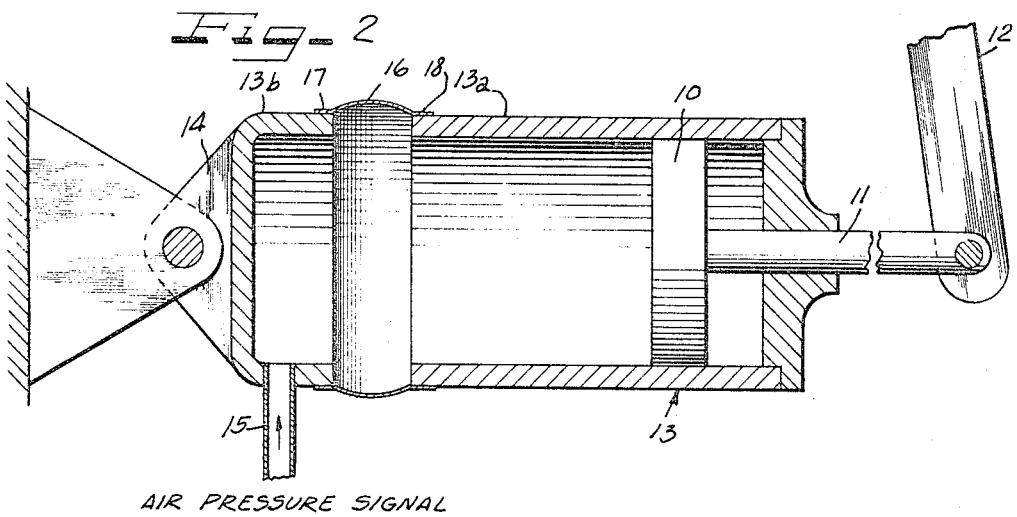
AIR PRESSURE SIGNAL
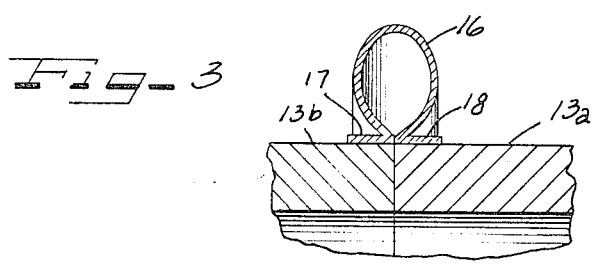
INVENTOR.
DONALD A. ELY
BY *Hill, Sherman, Meroni, Gross & Simpson* ATTORNEYS

United States Patent Office 3,434,396
Patented Mar. 25, 1969

3,434,396
PISTON DIAPHRAGM COMBINATION
Donald A. Ely, Beloit, Wis., assignor to Beloit Corporation, Beloit, Wis., a corporation of Wisconsin
Filed Feb. 20, 1967, Ser. No. 617,105
Int. Cl. F01b 19/04, 11/02; F16j 3/00
U.S. Cl. 92—36                              9 Claims

ABSTRACT OF THE DISCLOSURE

A fluid device for converting a pressure signal to a mechanical movement having a cylinder formed of two parts interconnected by a flexible wall member and a piston carried and supported by one of the cylinder parts. The flexible wall member enabling the piston and one cylinder part to initially move together before the piston slides within the cylinder part with any change of the pressure in the cylinder.

---

The present invention relates to improvements in mechanisms for converting a pressure signal to a displacement signal and more particularly to a device wherein pressure is employed to move a piston within a cylinder.

More particularly the present arrangement relates to devices of the type wherein a pressure signal is used to provide mechanical movement such as that used in relays, signal mechanisms, follow-up mechanisms, controls, regulators and similar apparatus. In devices such as relays and controls it is often important to have an immediate response with change in pressure signal. That is, changes in pressure must be manifested by an output mechanical movement and the mechanical movement output must be accurately responsive to the change in pressure. One disadvantage of devices of this type has been that there is a lag in the mechanical movement. With change in pressure immediate response is not received because the frictional drag of the piston on the wall of the cylinder must first be overcome. This lag occurs during the first increment of buildup in pressure change since that increment must be used to break the static frictional lock between the outer surface of the piston and the inner wall of the cylinder. As a result of this phenomena, very small changes in pressure are not manifested at all by corresponding piston movements.

It is accordingly an object of the present invention to provide a mechanical displacement device which provides an output mechanical movement as a function of an input pressure signal wherein immediate responses are had with pressure change and the usual frictional lag is not encountered.

Another object of the invention is to provide a conversion mechanism for converting a pressure change signal to a mechanical movement wherein extremely small pressure changes will cause a resultant mechanical output movement signal.

A still further object of the invention is to provide an improved signal conversion device for converting a pressure signal to a mechanical movement which is more responsive than devices heretofore available and which is inexpensive to construct and operate and does not require attention or adjustment for reliability.

Other objects, advantages and features will become more apparent with the teaching of the principles of the present invention in connection with the disclosure of the preferred embodiment thereof in the specification, claims and drawings in which:

FIGURE 1 is a somewhat schematic vertical sectional view of a mechanism embodying the principles of the present invention;

FIGURE 2 is an enlarged fragmentary view of the expansion joint of the mechanism showing the parts in expanded position; and FIGURE 3 is a fragmentary sectional view of the parts of FIGURE 2 showing them in compressed position.

On the drawings:

As illustrated in FIGURE 1, the mechanism includes a piston 10 with a piston rod 11 connected thereto adapted to be connected to an arm 12. The arm receives the mechanical displacement signal or movement of the piston 10 and may be part of a signal or relay mechanism which receives the displacement signal in response to an input air pressure signal.

The piston is slidably mounted within a cylinder 13. The cylinder has a cup shaped first portion 13a which directly receives the piston 10 with the rod 11 extending through an opening in an end wall of the first portion 13a and being slidably supported therein, and a cup-shaped second portion 13b which has an element 14 for connecting or mounting the cylinder, usually rigidly.

An air pressure signal line 15 communicates with the interior of the cylinder 13 to effect movement of the piston 10. While the line 15 may connect to any fluid pressure source, such as hydraulic fluid, the usual operation will embody an air pressure signal fed from a variable air pressure signal source.

As is recognized by those versed in the art, the increase or decrease of the pressure within the cylinder 13 is communicated therein through the line 15 will cause a pressure differential across the piston 10 and tend to cause it to move. However, before movement occurs the friction between the outer surface of the piston and the inner wall of the cylinder 13 must be overcome. Even with highly finished surfaces, with the choice of materials that creates a minimum frictional effect, and with lubrication frictional lag will occur. The piston will not begin movement until the air pressure signal has changed sufficiently to overcome the friction and during the time required for this pressure change movement of the piston will not occur so that there is a time delay or lag between the change in pressure input signal and displacement output signal. However, with the present arrangement this delay is eliminated.

Between the first portion 13a of the cylinder and second portion 13b is an axially flexible wall portion 16. In a preferred form this wall portion is a metal expansion joint, shown somewhat schematically in the drawings, which permits relative axial movement between the portions 13a and 13b of the cylinder without frictional drag.

The flexible joint 16 is shown somewhat schematically in the form of an annular flexible or elastic band mounted at its axial edges 17 and 18 on the ends of the portions 13b and 13a of the cylinder 13. The joint or band 16 has complete flexibility so that it requires substantially zero energy to expand it to contract it from its neutral position, yet it functions to retain the pressure within the cylinder 13. A bellows arrangement may also be used which will provide substantially no resistance to expansion or contraction. The axial movement of the flexible joint should be small relative to the latent movement of the piston, preferably less than the ratio of one to ten.

When an increase in pressure occurs within the cylinder as communicated thereto through the line 15, with the very first increment of pressure buildup the expansion joint 16 will expand until it reaches the full expanded position shown in FIGURE 2. The first movement will be by the cylinder end 13b with the piston as indicated by the right arrow on the arrowed line 18a. By this time the pressure signal buildup will be sufficient so that it will be adequate to break the friction between the piston 10 and the wall of the cylinder 13 so that no lag or delay will occur. The piston will then start to move as indicated by the right end of the arrowed line 19. If the change in pressure is a negative pressure or a drop therein the expansion joint will contract as shown in FIGURE 3. This illustration presumes that the system normally will be at neutral position to the parts substanially as shown in FIGURE 1. If the parts are in the position shown in FIGURE 2, any drop in pressure will first cause a contraction of the expansion joint 16. The parts start in the position shown in FIGURE 3 any increase in pressure will first cause an expansion of the joint 16 before movement of the piston 10 relative to the wall of the cylinder 13.

Thus it will be seen that I have provided an improved signal converting device which obtains the advantages and simple in construction avoiding costly parts and assembly objectives above set forth. The structure is relatively and permitting operation without attention or repair of the mechanism. The device affords instantaneous response with change in pressure signal and obtains a device which permits response at small pressure changes which were heretofore inadequate to overcome the friction between parts.

I claim as my invention:

1. A mechanism for converting a pressure signal to a displacement signal comprising,
   a piston for connecting to a load to produce movement thereof,
   a closed cylinder having a first portion slidably containing and supporting the piston and having a second portion with a mounting connection for securing the cylinder, said first portion being free of frictional restraint by surrounding structure,
   a fluid pressure line communicating with the inside of the cylinder to change the pressure therein for movement of said piston, and
   an axially expansible wall portion between said first and second portions permitting initial relative movement between said portions so that said piston and said first portion may initially have movement together before the piston slides within said first portion with change in pressure within the cylinder.

2. A mechanism for converting a pressure signal to a displacement signal in accordance with claim 1 wherein said expansible wall portion comprises a flexible expansion joint extending between the first and second portions of the cylinder for permitting axial movement therebetween.

3. A mechanism in accordance with claim 1 for converting a pressure signal to a displacement signal wherein said expansible wall portion comprises a metal expansion joint encircling the cylinder and interconnecting said first and second portions, said joint having limited movement.

4. A mechanism for converting a pressure signal to a displacement signal in accordance with claim 1 wherein said expansible wall portion has a resistance to movement in the axial direction considerably less than the frictional sliding resistance between the piston and the first portion of the cylinder.

5. A mechanism for converting a pressure signal to a displacement signal in accordance with claim 1 wherein the ratio of the limit of axial movement of said expansible wall portion to the total movement of the piston is less than one to ten.

6. A mechanism for converting a pressure signal to a displacement signal in accordance with claim 1 wherein said fluid pressure line has a source of pressure controlled air connected thereto.

7. A mechanism for converting a pressure signal to a displacement signal in accordance with claim 1 wherein said piston and cylinder are circular in cross section and the piston is provided with piston rod for connecting to a load to produce the movement thereof and wherein the expansible wall portion comprises an encircling flexible annular wall connected at the axial ends to the first and second portions of the cylinder with the ends of the portions of the cylinder abutting at one limit of movement of the wall portion and with the wall portion extending substantially flat axially at the other limit of movement.

8. A mechanism for converting a pressure signal to a displacement signal in accordance with claim 1, wherein said piston is provided with a piston rod for connecting to a load to produce the movement thereof, wherein said first portion of said cylinder has means for slidably supporting and guiding said piston rod, so that the piston rod, piston and first portion of the cylinder may initially have movement together before the piston rod and piston move with respect to said first portion with changes in pressure within the cylinder.

9. A mechanism for converting a pressure signal to a displacement signal in accordance with claim 8, wherein said first and second portions are cup-shaped members with the piston rod extending through an opening in the bottom wall of the first portion, and said expansible wall member is a flexible band encircling said cylinder and interconnecting the open ends of the first and second portions.

References Cited
UNITED STATES PATENTS

| | | | |
|---|---|---|---|
| 1,414,835 | 5/1922 | Spohrer | 92—52 X |
| 2,255,005 | 9/1941 | Rodanet | 92—43 X |
| 2,367,852 | 1/1945 | Eaton | 92—52 |
| 2,610,644 | 9/1952 | Carlisle et al. | 92—43 X |
| 2,811,137 | 10/1957 | Hartel | 92—52 X |
| 3,037,273 | 6/1962 | Hurt | 92—34 X |

MARTIN P. SCHWADRON, Primary Examiner.

I. C. COHEN, Assistant Examiner.

U.S. Cl. X.R.

92—43, 117, 169